(12) United States Patent
Rao et al.

(10) Patent No.: US 8,074,119 B1
(45) Date of Patent: Dec. 6, 2011

(54) METHOD AND APPARATUS FOR PROVIDING A MULTI-SCOPE BUG TRACKING PROCESS

(75) Inventors: Surya P. Rao, San Jose, CA (US); Manoj B. Joshi, Santa Clara, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 308 days.

(21) Appl. No.: 12/055,645

(22) Filed: Mar. 26, 2008

(51) Int. Cl.
   *G06F 11/00* (2006.01)
(52) U.S. Cl. .................. 714/48; 714/38.1; 714/57
(58) Field of Classification Search ............ 714/48, 714/57, 38.1; 717/124, 170
   See application file for complete search history.

(56) References Cited

U.S. PATENT DOCUMENTS

| | | | |
|---|---|---|---|
| 5,960,196 A * | 9/1999 | Carrier et al. ................ | 717/122 |
| 6,665,824 B1 * | 12/2003 | Ruhlen et al. ................. | 714/57 |
| 6,785,848 B1 * | 8/2004 | Glerum et al. ................ | 714/38 |
| 6,968,550 B2 * | 11/2005 | Branson et al. .............. | 717/168 |
| 7,516,438 B1 * | 4/2009 | Leonard et al. ............... | 717/102 |
| 2007/0101208 A1 * | 5/2007 | Mohr ............................. | 714/57 |

* cited by examiner

*Primary Examiner* — Charles Ehne
(74) *Attorney, Agent, or Firm* — James M. Wu; JW Law Group (57) ABSTRACT

A process capable of tracking bugs across multiple product releases using multiple scopes is disclosed. Upon receipt of a bug report, a process creates a defect record in a storage memory wherein the record describes the bug in accordance with the bug report. After allocating a first scope associated with a first product release and a second scope associated with a second product release, the process displays the defect record together with the first scope and the second scope on a screen. The first scope allocates a portion of the storage space to track a bug status associated with the first product release and the second scope allocates another portion of the storage space to track the bug status associated with the second product release.

22 Claims, 5 Drawing Sheets

METHOD AND APPARATUS FOR PROVIDING A MULTI-SCOPE BUG TRACKING PROCESS

FIELD

The exemplary embodiment(s) of the present invention relates to system and software verification. More specifically, the exemplary embodiment(s) of the present invention relates to error or bug tracking system.

BACKGROUND

Effective bug tracking system is critical for removing errors or bugs in a software product across multiple releases. A problem associated with the current software configuration management and/or software bug tracking processes is keeping track of bug fixing status across product releases. To improve product quality between releases, it is important to know whether a given bug-fix or bug-patch has entered in a specific release. To remove a bug(s) between product releases, a conventional bug tracking system clones the bug for every release.

Cloning is typically a process of making copies of the bug-records for tracking bug status for a release. A typical bug-tracking tool allows cloning bug-records for different releases and allows for a single life-cycle for a software bug, which tracks a single bug in a single software release. In reality, however, the detected bug may need to be fixed in multiple releases, and cross-references between clones in different releases are typically difficult.

As such, a drawback associated with cloning is that it is possible to fix the same bug multiple times in multiple releases by different persons or engineers. Another problem associated with cloning is that cloned copies of bugs are disconnected. As such, the updates and/or analysis performed in one cloned copy typically do not reflect in other copies of clones. In yet another problem associated with cloning is artificially inflating bug count, which leads to incorrect bug reports and statistics.

SUMMARY

A process capable of tracking bugs across multiple product releases using multiple scopes is disclosed. Upon receipt of a bug report, a process creates a defect record in a storage memory wherein the record describes the bug in accordance with the bug report. After allocating a first scope associated with a first product release and a second scope associated with a second product release, the process displays the defect record together with the first scope and the second scope on a screen. The first scope allocates a portion of storage space to track a bug status associated with the first product release and the second scope allocates another portion of the storage space to track the bug status associated with the second product release.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, system and apparatus of tracking a bug or fault across multiple product releases using a multi-scope bug tracking process.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

A process capable of tracking bugs across multiple product releases using multiple scopes is disclosed. Upon receipt of a bug report, a process creates a defect record in a storage memory wherein the record describes the bug in accordance with the bug report. After allocating a first scope associated with a first product release and a second scope associated with a second product release, the process displays the defect record together with the first scope and the second scope on a screen. The first scope allocates a portion of the storage space to track a bug status associated with the first product release and the second scope allocates another portion of the storage space to track the bug status associated with the second product release.

Figure 1:
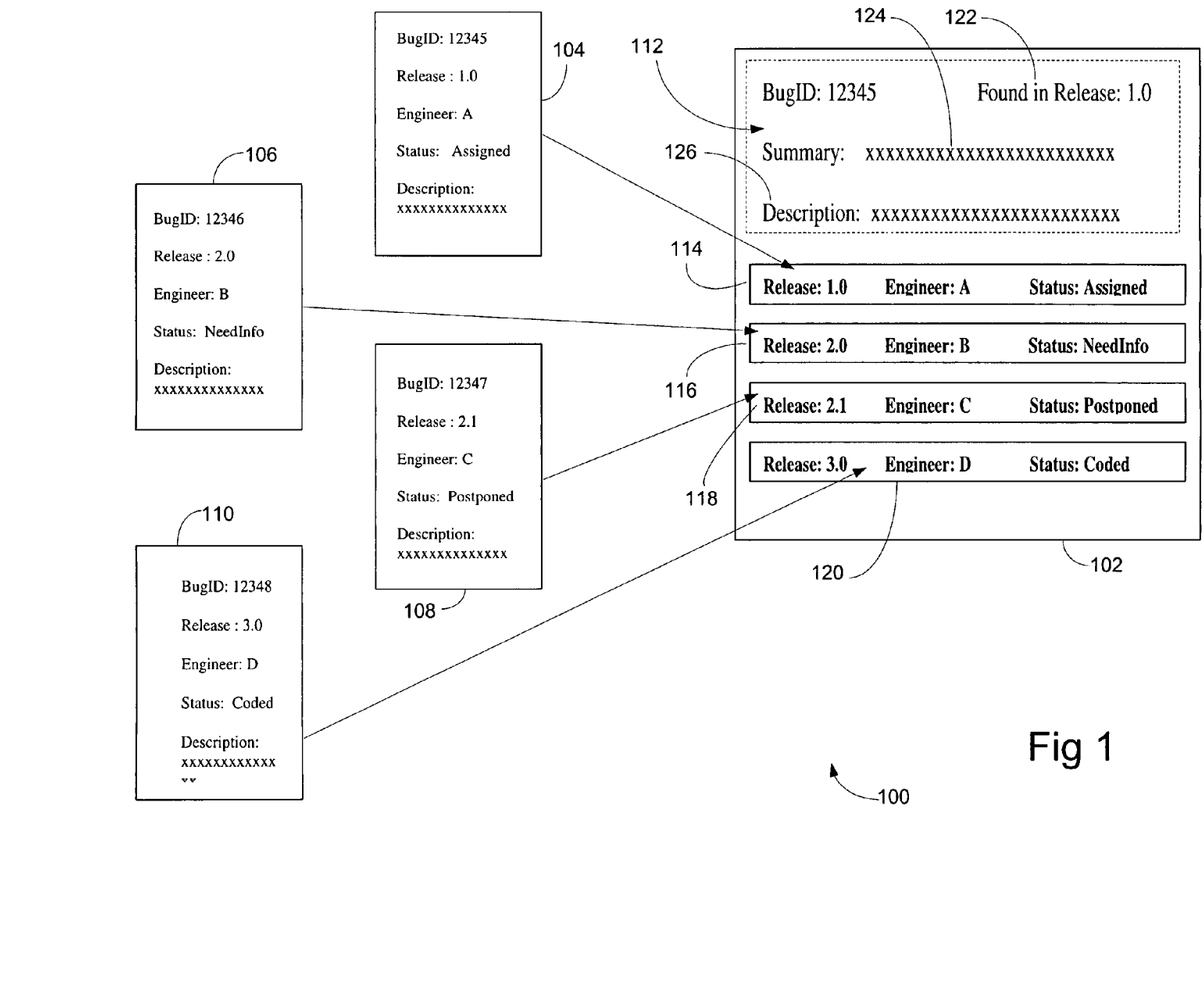
FIG. 1 is a block diagram illustrating a bug tracking system having multiple scopes in accordance with one embodiment of the present invention.

FIG. 1 is a block diagram 100 illustrating a bug tracking system using multiple scopes in accordance with one embodiment of the present invention. Diagram 100 shows a bug tracking window 102 and multiple bug assignments 104-110. Bug assignments 104-110, in one embodiment, are related to the same or substantially the same bug across different product releases. A bug is an error or fault or a combination of multiple errors occurred during an operation. A bug, for example, may be related to a software error or a hardware error or a combination of hardware and software errors. It should be noted that the underlying concept of the exemplary embodiment(s) of the present invention would not change if one or more blocks (circuit or windows) were added to or removed from diagram 100.

Bug tracking window 102, in one embodiment, includes a defect record 112 and multiple scope records 114-120. It should be noted that the multi-scope bug tracking process includes two entities, which are defect record(s) and scope record(s), to track the bugs. Multiple scope records 114-120 are also known as multi-scopes, scopes, scope records, sub-windows, and they can be used interchangeably herein. Defect record 112 further includes a bug identifier ("ID"), a found-in-release field 122, a summary field 124, and a description field 126. Defect record 112 is capable of including more fields, such as reporter, component, priority, severity, and the like. In one embodiment, the fields of defect record 112 can be selectively displayed.

The bug ID is also known as a defect ID and is a unique identifier for the bug record. The bug ID may be assigned by a release administrator, an originator, or a system in response to the bug report and is used by the multi-scope bug tracking system to track the bug status. Administrator is a person who receives all bug reports and subsequently, distributes (or assigns) each bug to various groups to fix the problem. The originator, also known as reporter, is a person who discovers the problem or fault or bug, and subsequently submits the bug report. The bug can also be reported by a system, which is capable of assigning a bug ID associated with the bug and submitting it to the bug tracking system. For example, the bug ID as illustrated in FIG. 1 has an identification number of 12345.

Found-in-release field 122 identifies a product release number in which a bug is discovered and/or reported. For example, found-in-release field 122 is 1.0, as shown in FIG. 1, which indicates that the bug identified by bug ID 12345 is discovered and reported in product release 1.0. Found-in-release field 122 may also indicate a version or release of software in which the error or problem or fault is observed.

Summary 124, also known as headline, is a brief abstract or summary identifying the bug. For example, summary 124 is required to summarize the bug into one single line. The content of summary 124 may be generated by the originator, the administrator, or the system. It should be noted that the content of summary 124 can be different in length depending on the application. For instance, for some applications, summary may be entered by a system with standard language, while other applications, summary may be entered by the operator with natural language. Description 126 includes a detailed description of the bug including reproduction steps. In one embodiment, description 126 is combined with summary 124 when independent summary is not necessary. The content of description 126 is the same or substantially the same as the descriptions in bug assignments 104-110.

In one embodiment, defect record 112 includes a bug report as originally submitted and is stored in a storage memory. It should be noted that defect record or defect records store various fields, such as bug records including problem summary and description, submitter name, component and/or feature against which the problem was submitted, and the software release or version in which the problem was discovered. In addition, the defect record can also be configured to include a status field indicating whether the bug is newly submitted or has been analyzed once the content of defect record 112 is established and stored in accordance with the bug report. Also, the content of defect record, for example, may not change when it moves through state transitions.

Referring back to FIG. 1, multiple scopes 114-120 include release fields, engineer fields, and status fields. For example, release field of scope 114 is 1.0 while engineer field of scope 116 is B. Also, the status field of scope 118 is "Postponed" while the status field of scope 120 is "Coded". It should be noted that the multi-scope bug tracking process uses scopes or scope records to track the bugs.

Each scope is a logical entity, which is defined as a collection of fields related to a given release stream in which the defect record will be addressed. A release stream includes a series of product releases, such as release 1, release 2, and so forth. For example, for a given defect record D1, a scope record identified S1.10 indicates that D1 will be addressed in the product release 1.10. Any additional scopes or scope records can be created in the defect record to address the same issue or bug or defect in different releases. As such, each scope carries enough information to track the bug or defect for an associated product release or version. It should be noted that additional scopes can be added to a given defect record and each scope is designed to have sufficient fields to track the work flow, such as a specific release, engineer assignment, status of the bug associated to the release, audit-trail, and the like.

Scope 114, for example, shows a bug status associated with bug ID 12345 in defect record 112. More specifically, scope 114 illustrates a bug status of assignment, which indicates that the bug has been assigned to engineer A for the product release 1.0. Alternatively, scope 116 is designated to release 2.0 and indicates that the bug has been assigned to engineer B. The status field of scope 116 indicates that more information is needed. Also, scope 118 is designated to release 2.1 and the bug status indicates that bug fixing has been postponed. The status of scope 120 indicates that the code to fix the bug has been coded by engineer D and it will be available in release 3.0. It should be noted that more scopes can be added if more releases are planned in the release stream. It should be further noted that additional fields can be added in scopes 114-120 for displaying. In one embodiment, various fields of the scope can be selectively displayed depending on the applications.

Additional fields for defect record and scopes are listed in the following two tables.

TABLE 1

Defect Record Fields (Scope-Independent Fields)

| Field Name | Description |
| --- | --- |
| Defect ID | A unique identifier for the Defect Record. |
| Reporter | The full name of the engineer submitting the Defect Record |
| Found In Release | The version or release of software where the problem was observed. |
| Feature Name | Name of the feature of the Software product where the bug is seen. |
| Found in build | Name of the build or baseline label where the problem can be observed. |
| Target Fix In Release | Software Release where a fix is desired (used for making default scope) |
| Component | Name of the specific component of Software where the bug was found. |
| Priority | Importance with which a fix is needed |
| Severity | Degree of impact on the customer or the test team. |
| Detected Phase | Specific phase of software life cycle where the problem could have been introduced. |
| Assigned Engineer | The engineer who gets notified and is also the initial owner of the bug upon submission. |

TABLE 1-continued

Defect Record Fields (Scope-Independent Fields)

| Field Name | Description |
| --- | --- |
| Customer Name | Name of the Customer where the problem was observed (if from field) |
| Customer Case Number | Identifier that is used by Customers to refer to this bug. |
| Headline | One line summary of the bug. |
| Description | Detailed description of the problem including reproduction steps. |
| Notes | Miscellaneous Information. |

TABLE 2

Scope Record Fields (Scope-Specific Fields)

| Field Name | Description |
| --- | --- |
| Scope ID | Unique identifier (system generated) to refer to this scope |
| Scope Release | The software release in which the parent Defect Record will be fixed. |
| Scope Assigned Engineer | The responsible engineer or owner of the bug in context of this release for the Defect Record. |
| Disposition | The type of fix made to address the Defect in the current scoped release |
| Status | Current status of the Scope Record in the specific release. |
| Test Engineer | The engineer responsible for verifying the bug-fix in the current release |
| History | Audit trail |
| Verified in Build | Build label of one of the baselines of the current release where the fix is available. |

It should be noted that fields categorized as scope-specific illustrated in tables can have multiple values, wherein each value can be designated to a scope.

The physical size of a scope is, in one embodiment, predefined and the scope is stored in a storage memory, which corresponds to a specific product release for fixing the bug identified by defect record 112. The scope record may include software release information in which the bug will be fixed, name of engineer(s) responsible for fixing the bug in context of the specific release, and the current state of the scope record in a specific release. Scopes 114-120, in one embodiment, are associated with bug assignments 104-110.

Bug assignments 104-110, in one embodiment, are data structures that support scopes 114-120. Each bug assignment is dedicated to a single version or release, wherein each assignment further includes multiple fields, such as a bug ID, a release field, an engineer field, a status field, a description field, and so forth. The bug ID matches or substantially matches with bug ID of defect record 112. It should be noted that bug assignment is optional if scope has its own data structure allocated in the memory.

Bug tracking window 102, in one embodiment, displays defect record 112 and scopes or scope records 114-120 on the same screen or a scrollable screen. For instance, a user or operator can track a particular bug identified by the bug ID across multiple product releases with different statuses and owners within a bug tracking window. In addition, any fixes or methods can be shared across scopes 114-118. For example, an engineer who is responsible for fixing the bug in a particular release is able to download a fix or a patch from another scope associated with another release on window 102.

An advantage of using the multi-scope bug tracking process is to enhance the capability of tracking bugs across multiple product releases while affording the bug owners of each release to work independently of each other.

Figure 2:
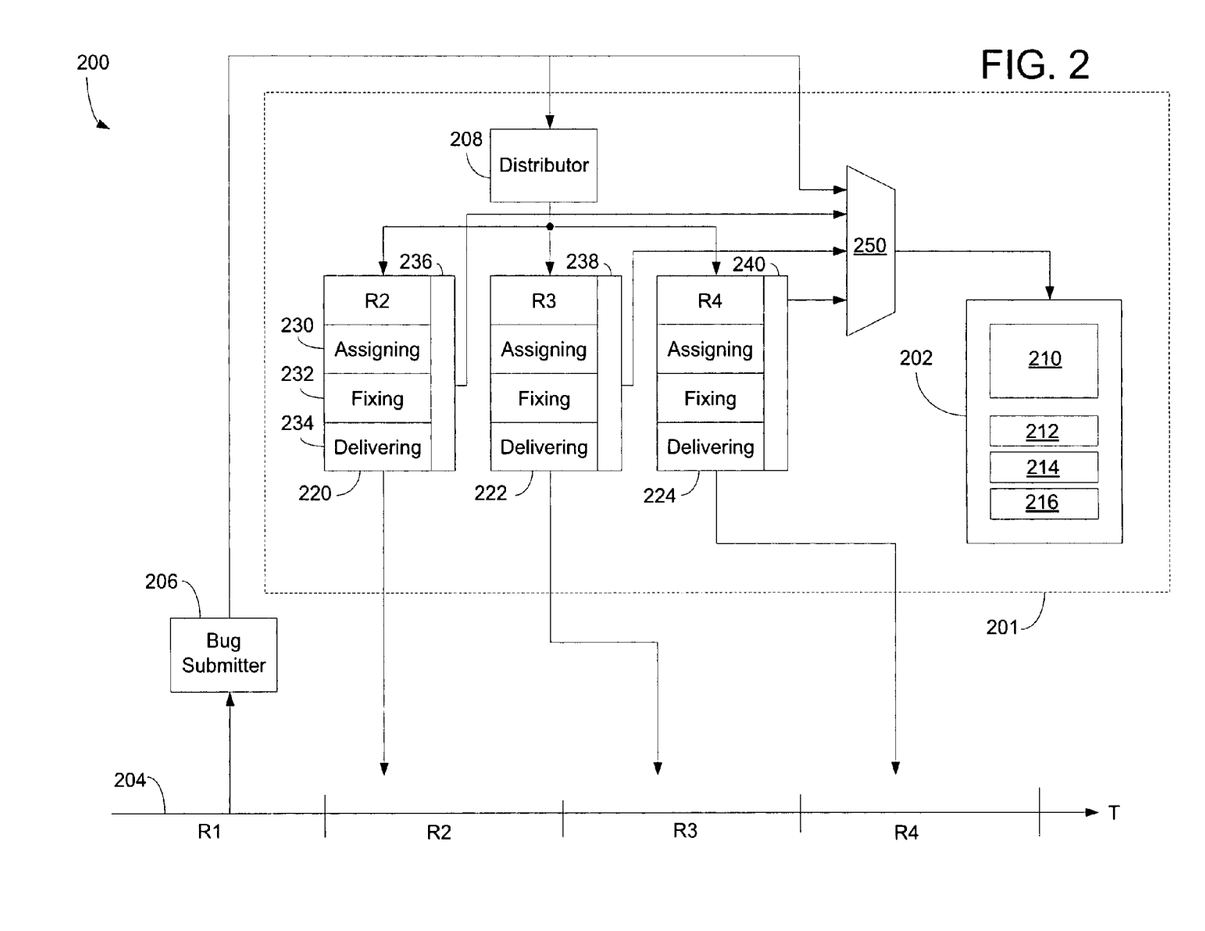
FIG. 2 is a block diagram illustrating a multi-scope bug tracking system capable of tracking a bug across multiple releases in accordance with one embodiment of the present invention.

FIG. 2 is a block diagram 200 illustrating a multi-scope bug tracking system 201 capable of tracking a bug across multiple releases in accordance with one embodiment of the present invention. System 200 includes multi-scope bug tracking system 201 and a time line 204, wherein time line 204 indicates four (4) product (or software) releases designated by R1-R4 across a period of time. It should be noted that the underlying concept of the exemplary embodiment(s) of the present invention would not change if one or more blocks (circuit or windows) were added to or removed from diagram 200.

Multi-scope bug tracking system 201 further includes a distributor 208, a multiple scopes bug tracking window 202, and multiple release assignments 220-224. Distributor 208 receives bugs or faults or errors from a bug reporter or a bug originator, and subsequently distributes or assigns each bug to a group, which is responsible to fix the bug in a particular release. Distributor 208, in one embodiment, is managed by a bug administrator or operator who is responsible to distribute and track the bugs. Alternatively, distributor 208 can be a computer system or a digital processing device capable of receiving new bugs and distributing the bugs to various groups in accordance with a set of predefined policies. It should be noted that each group may include engineers, technicians, and/or operators capable of analyzing and fixing the bug.

Assignments 220-224 include three structures wherein each structure is dedicated to a product release. Each structure, in one embodiment, includes an assigning field 230, a fixing field 232, and a delivering field 234. Assigning field 230, for example, is used to indicate which group or which person(s) is responsible to fix the bug in the designated release. For example, assignment 220 contains status information relating to release 2 or R2. Fixing field 232 indicates how the bug should be fixed in connection with the designated release. The fixing field in assignment 222, for instance, indicates a software fix in connection to release 3 while the fixing field in assignment 224 indicates a hardware fix in connection with release 4. The delivering fields of assignments 220-224 indicate the delivery time periods, such as release 2, 2.1, 3, 4, or the like. Assignments 220-224 further include status collectors 236-240, respectively. A function of the status collector is to forward status relating to bug fixing for the release to tracking window 202 via a control gate 250. Assignments 220-224, in one example, can contain additional fields, such as bug ID, description, status, and so forth.

It should be noted that multi-scope bug tracking system 201 may contain additional assignments. For example, system 201 may include an assignment for release 1 or R1 if a quick patch is needed in release 1. Also, assignments 220-224 may be the same blocks as bug assignments 104-110, shown in FIG. 1. It should be further noted that assignments 220-224 can be merged with multiple bug tracking window 202.

Multiple bug tracking window 202, which performs similar function as bug tracking window 102 illustrated in FIG. 1, includes a defect record 210 and multiple scopes 212-216, wherein scopes 212-216 are used to display the bug status associated with product releases such as R1 to R4. For example, scope 212 may be designated to release 2 status and it is capable of collecting and displaying bug status in connection with release 2 or R2. It should be noted that additional scopes may be added if more releases are planned.

Diagram 200 further includes a bug submitter 206, which is capable of discovering new bugs and forwarding the bugs to the multi-scope bug tracking system. For example, bug submitter 206 detects a bug in release 1, wherein bug submitter 206 can be an originator, a tester, a user, a customer, or a system. Upon detecting a bug, bug submitter 206 transmits the detected bug to distributor 208 for distribution. In one embodiment, bug submitter 206 also submits the bug to control gate 250, which subsequently forwards the information relating to the bug to window 202 for display.

Alternatively, window 202 receives display information from distributor 208 or assignments 220-224 via control gate 250. In one embodiment, submission of a bug via bug submitter 206 creates a record in storage memory describing the bug in accordance with the bug report. The bug submitted, for example, can come from a bug administrator or an operator indicating the discovery of an error. The detected bug is further reflected in defect record 210 in bug tracking window 202.

During an operation, upon detecting a bug in release 1, the bug originator or reporter at bug submitter 206 forwards the information relating to bug to distributor 208. The bug administrator or responsible party distributes the bug to various groups in accordance with the product releases. Depending on the number of releases, a database including the same or substantially the same number of data structures 220-224 is formed to track the bug status in connection with the releases. Multi-scope bug tracking window 202 displays bug fixing status across the releases in one or multiple screens. Each of scopes 212-216, for example, may go through several states within the life cycle of its corresponding product release. The state reflects, but is not limited to, the engineer or owner of the bug in context of a specific release, the current status of the bug in a specific release, and the state of delivery.

Figure 3:
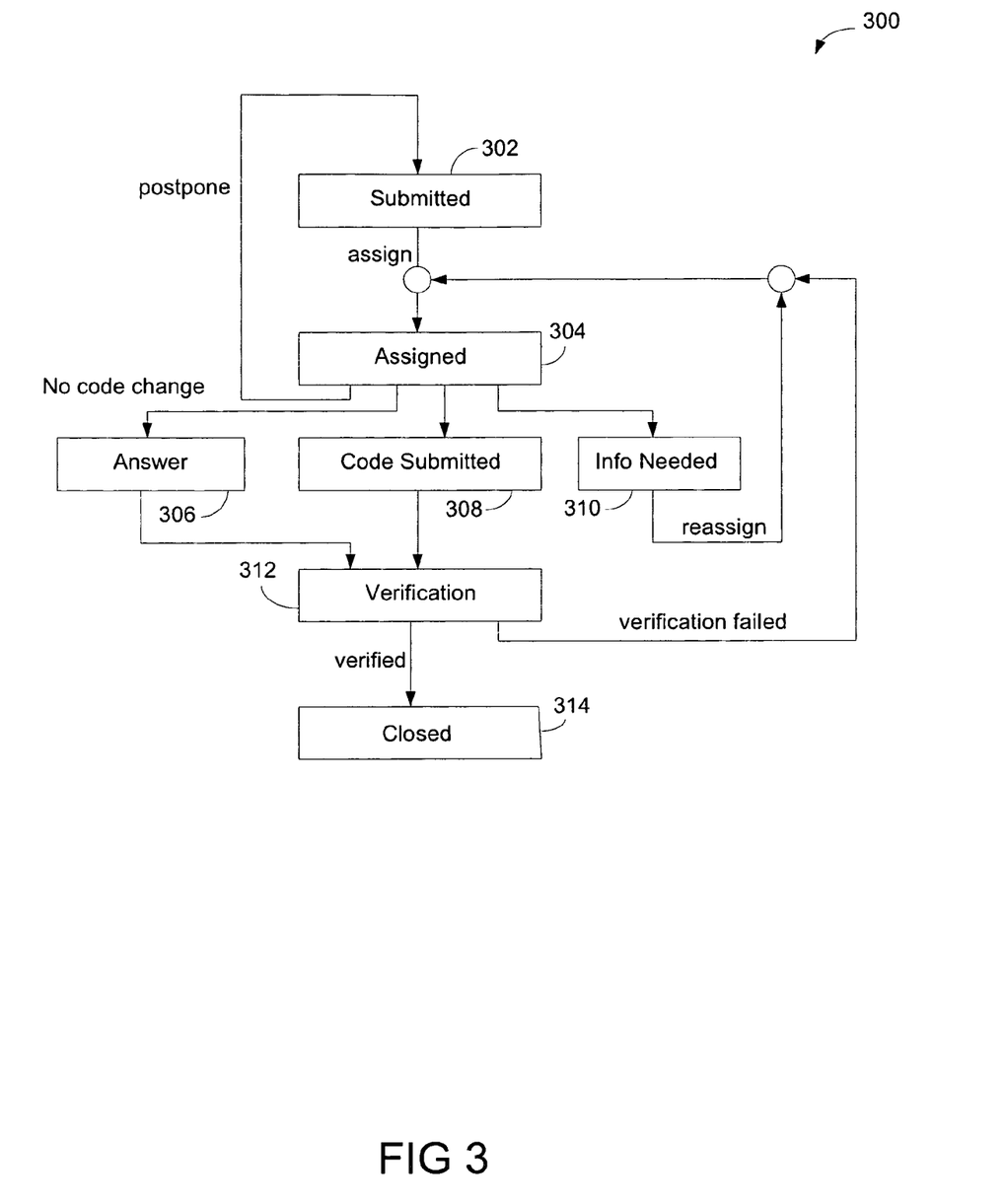
FIG. 3 is a state transition diagram illustrating a multi-scope bug tracking system using a bug tracking tool in accordance with one embodiment of the present invention.

FIG. 3 is a state transition 300 illustrating a multi-scope bug tracking system using a bug tracking tool in accordance with one embodiment of the present invention. Multi-scope bug tracking system, in one embodiment, can be implemented with a modern bug tracking tool such as ClearQuest™. State transition 300 illustrates an exemplary state transition using multi-scope bug tracking system within a bug tracking tool. It should be noted that the underlying concept of the exemplary embodiment(s) of the present invention would not change if one or more states or blocks were added to or removed from diagram 300.

At state 302, upon receipt of a bug report, a tracking system distributes the bug or bug information to state 304 for assignment. Upon submission at state 302, a defect record is created by a responsible party such as a bug administrator. At state 304, the system determines whether it has sufficient information to assign the bug. If the information relating to the bug is insufficient, the system transits from state 304 to state 310 for reassignment due to insufficient information. Alternatively, the system can transit to state 302 from state 304 if it determines that the transition should be postponed. If, however, the system determines that the bug has sufficient information, it is configured to identify whether the code should be updated. If the updating is not required, the system transits from state 304 to state 306 to provide an answer without code change. Alternatively, the system transits from state 304 to state 308 for submitting the updated code. Upon receipt of answer from state 306 or updated code from state 308, the system verifies the answer from state 306 or updated code from state 308. If the verification is failed, state 312 loops back to state 304 for new assignment. If the code or answer is verified, the system reaches to state 314, which closes the current state transition.

Transition state 300 illustrates transition between states, wherein the transition can be captured and displayed by the scopes. For example, if one or more scopes display transition of states illustrating bug status from state to state, the process verifies the bug fix at state 312 before the state transits to state 314. Verification may be performed by a testing department or assurance department in an organization, organization's client, or other users. Upon verifying the fix, the system ends at state 314. Alternatively, the system may loop back to state 302 to repeat a state transition. It should be noted that the defect records and scope records can share a parent-child relationship and can also be independent from state transition cycle.

Defect records, in one embodiment, can be submitted by an end-user or a customer, or a field engineer after detecting the bug. A scope record can subsequently be created by a default program associated with a product release, in which a desirable fix may be submitted. The multi-scope bug tracking process provides bug fixing status across multiple releases via scopes. Alternatively, automation of state transition for defect and scope records can be implemented using predefined policies and tools, such as drop down lists, field behaviors, access controls, initialization, validation, automation, and the like. It should be noted that the database for storing defect records and scope records can be maintained and/or updated by a bug tracking tool such as ClearQuest™.

The multi-scope bug tracking process, in one aspect, is configured to allow a user to generate one or more reports associated with bug fixing status. A report generator option can be presented on the scope. For example, a user can click the option of report generator to generate a set of reports. Various types of report based on the above-described fields may be available and can be selectively generated. Table 3 listed below illustrates sample reports, which can be selectively generated.

TABLE 3

1 Generating a to-do-list for individual team member to obtain a quick access to his/her prioritized development activities
2 Tracking progress for a submitted defect across multiple product releases
3 Identifying a particular defect, which is fixed across multiple releases with time stamp
4 Identifying a particular defect (bug) pending across multiple releases with time stamp
5 Duplicating bug report for different releases
6 Generating a report for the defect Found-In-Release and identifying specific features and fixes across multiple scope releases An advantage of using multi-scope bug tracking process is to assist project or product managers or developers to track a software or hardware bug across multiple product releases. For instance, the multi-scope bug tracking process improves the capabilities of tracking bug status at different states in each of the multiple product releases. A bug owner of one release, who is responsible to fix the bug, is capable of obtaining technical information relating to the bug from another scope.

The exemplary embodiment of the present invention includes various processing steps, which will be described below. The steps of the embodiment of the present invention may be embodied in machine or computer executable instructions. The instructions can be used to cause a general purpose or special purpose system, which is programmed with the instructions, to perform the steps of the exemplary embodiment of the present invention. Alternatively, the steps of the present embodiment can be performed by specific hardware components that contain hard-wired logic for performing the steps, or by any combination of programmed computer components and custom hardware components.

Figure 4:
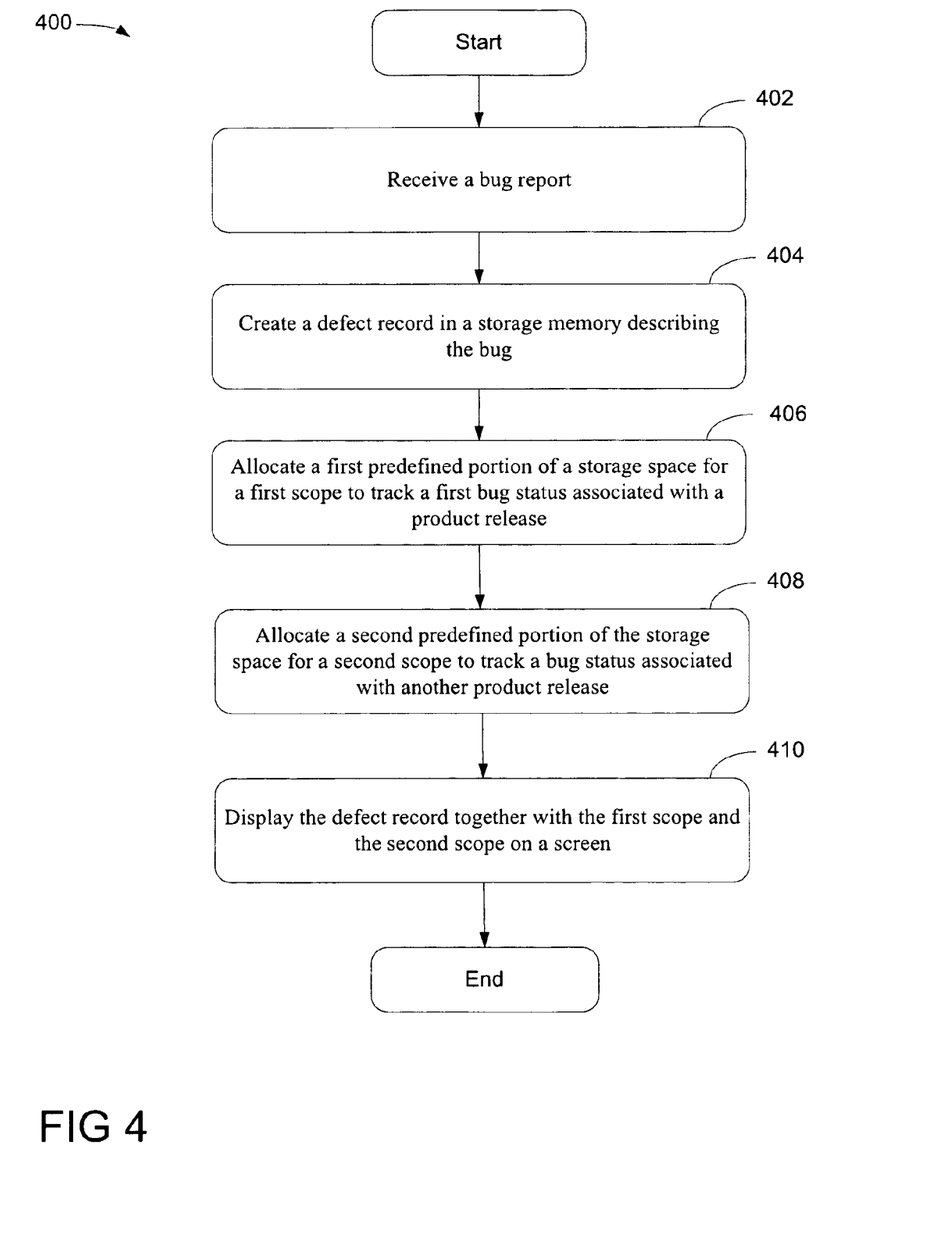
FIG. 4 is a flowchart illustrating a multi-scope bug tracking process in accordance with one embodiment of the present invention.

FIG. 4 is a flowchart 400 illustrating a multi-scope bug tracking process in accordance with one embodiment of the present invention. At block 402, a process receives a bug report. During a system processing period, an error is discovered by a person or a device. Upon discovering the error, the bug report is generated. The process, for example, is capable of recognizing a hardware error, a software error, or a combination of hardware and software errors. The process is also capable of submitting the bug report to a bug administrator via an operator or a reporter indicating the discovery of the error. After block 402, the process moves to the next block.

At block 404, the process creates a defect record describing the bug in accordance with the bug report. The process creates and stores the defect record in a storage memory, and is further capable of allocating an identification field, a summary field, a description field, and a multi-scope field in the storage memory. The defect record, in one embodiment, is customizable based on applications and organizations. Alternatively, the defect record is allocated with a predefined data structure. After block 404, the process proceeds to the next block.

At block 406, the process allocates a first predefined portion of storage space for a first scope used to track a first bug status associated with a first product release. The process, in one embodiment, creates a product release field, an assignment field, and a status field in the storage memory and subsequently, it enters product release information in the release field, name of responsible engineer in the assignment field, and bug status in the status field. After block 406, the process moves to the next block.

At block 408, the process allocates a second predefined portion of the storage space for a second scope to track a second bug status associated with a second product release. The first product release, for example, is release 1.0 while the second product release is release 2.0. Bug fixes for the same bug across the different releases can be different. For example, the bug fix for the release 1.0 may be a software patch while the bug fix for the release 2.0 is a hardware fix. After block 408, the process moves to the next block.

At block 410, the process displays the defect record together with the first scope and the second scope on a screen, which can be a single screen or a scrollable screen. In one embodiment, the process is capable of providing the screen with multiple windows for displaying bug status and identifying scopes associated with the defect record. The process may also be able to assign one of the windows to one of the scopes and insert information relating to the scopes presenting bug status in accordance with the product releases. Alternatively, the process also provides or proposes bug fixes via one or more scopes. After block 410, the process ends.

Figure 5:
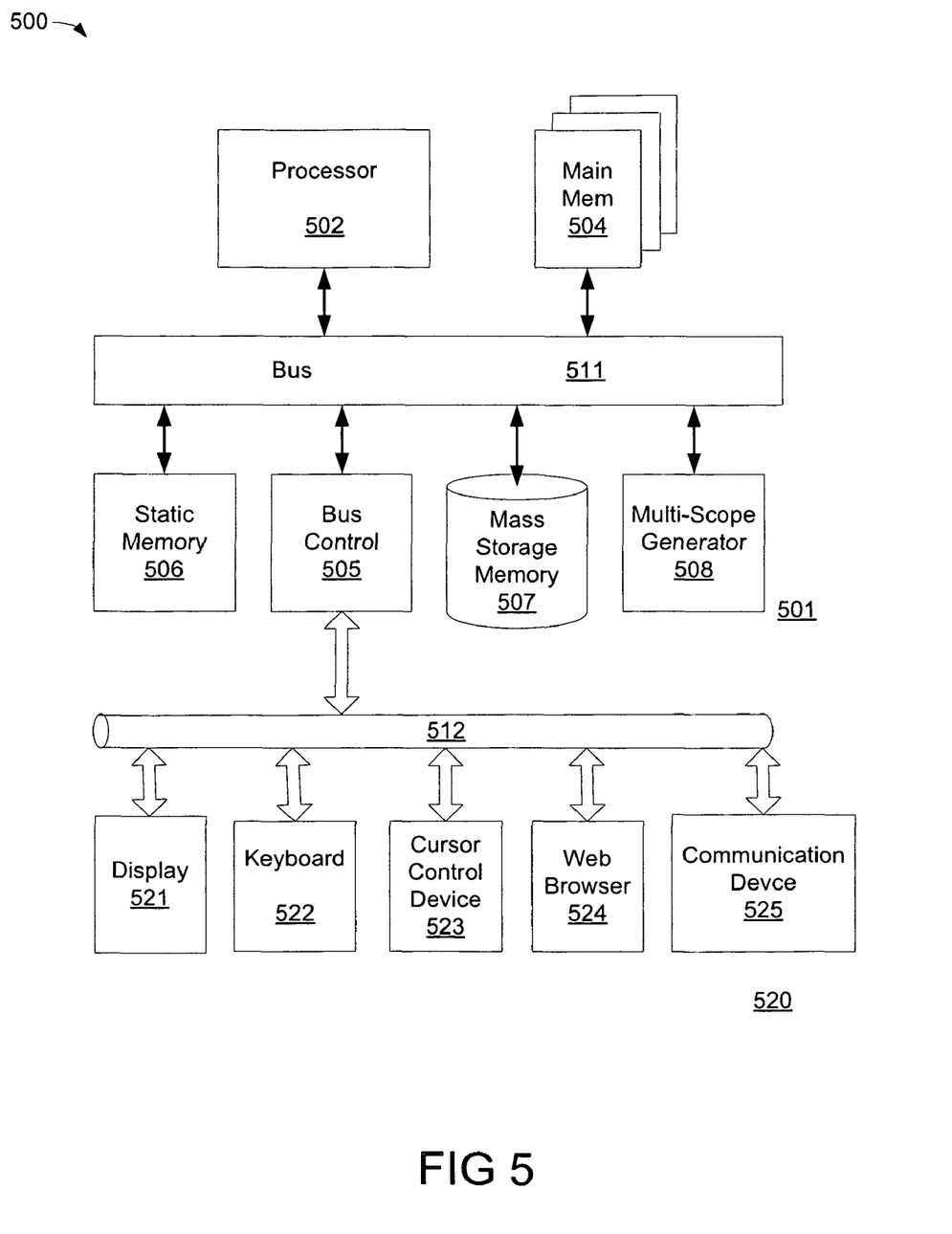
FIG. 5 is a block diagram illustrating a multi-scope bug tracking system in accordance with one embodiment of the present invention.

Having briefly described one embodiment of the multi-scope bug tracking process in which the exemplary embodiment of present invention operates, FIG. 5 illustrates an example of a computer system 500, which is an exemplary bug tracking system or a bug tracking system tool in which the features of the present embodiment may be implemented. It will be apparent to those of ordinary skill in the art that other alternative computer system architectures may also be employed.

Computer system 500 includes a processing unit 501, an interface bus 512, and an input/output ("IO") unit 520. Processing unit 501 includes a processor 502, a main memory 504, a system bus 511, a static memory device 506, a bus control unit 505, and a mass storage memory 507. Bus 511 is used to transmit information between various components and processor 502 for data processing. Processor 502 may be any of a wide variety of general-purpose processors, embedded processors, or microprocessors such as ARM® embedded processors, Intel® Core™ 2 Duo, Core™ 2 Quad, Xeon®, Pentium™ microprocessor, Motorola™ 68040, AMD® family processors, or Power PC™ microprocessor.

Main memory 504, which may include multiple levels of cache memories, stores frequently used data and instructions. Main memory 504 may be RAM (random access memory), MRAM (magnetic RAM), or flash memory. Static memory 206 may be a ROM (read-only memory), which is coupled to bus 511, for storing static information and/or instructions. Bus control unit 505 is coupled to buses 511-512 and controls which component, such as main memory 504 or processor 502, can use the bus. Mass storage memory 507 may be a magnetic disk, an optical disk, hard disk drive, floppy disk, CD-ROM, and/or flash memories for storing large amounts of data.

I/O unit 520, in one embodiment, includes a display 521, keyboard 522, cursor control device 523, web browser 524, and communication device 525. Display device 521 may be a liquid crystal device, cathode ray tube ("CRT"), touch-screen display, or other suitable display device. Display 521 projects or displays graphical images or windows. Keyboard 522 can be a conventional alphanumeric input device for communicating information between computer system 500 and computer operator(s). Another type of user input device is cursor control device 523, such as a mouse, touch mouse, trackball, or other type of cursor for communicating information between system 500 and user(s).

Communication device 525 is coupled to bus 211 for accessing information from remote computers or servers through wide-area network. Communication device 525 may include a modem, a router, or a network interface device, or other similar devices that facilitate communication between computer 500 and the network.

Processing unit 501 further includes a multi-scope bug tracking generator 508, which is capable of communicating with a bug tracking tool. Multi-scope bug tracking generator 508 facilitates and enhances bug tracking capabilities across multiple product releases. Generator 508 generates multiple scopes to show bug fixing status associated with identified releases.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for bug tracking comprising:
   receiving a bug report;
   creating a defect record describing a bug in accordance with the bug report;
   allocating a first predefined portion of a storage space for a first scope to track a first bug status showing progress of fixing the bug associated with a first product release;
   allocating a second predefined portion of the storage space for a second scope to track a second bug status showing progress of fixing the bug associated with a second product release; and
   displaying the defect record together with the first scope and the second scope on a screen, wherein displaying the defect record together with the first scope and the second scope on a screen further includes providing a fix to the bug available for download.

2. The method of claim 1, further comprising:
   discovering an error during a system processing period; and
   generating the bug report in response to the error.

3. The method of claim 2, wherein discovering an error during a system processing period further includes recognizing one of a hardware error, a software error, and a combination of hardware and software errors.

4. The method of claim 3, wherein generating the bug report in response to the error further includes submitting the report to a bug administrator by an operator indicating a discovery of the error.

5. The method of claim 1,
wherein creating a defect record further includes storing defect record in a storage memory; and
wherein storing defect record in a storage memory includes allocating an identification field, a summary field, a description field, and a multi-scope field.

6. The method of claim 1, wherein allocating a first predefined portion of storage space for a first scope further includes creating a product release field, an assignment field, and a status field.

7. The method of claim 6, wherein creating a product release field, an assignment field, and a status field further includes:
identifying product release information in the release field;
entering a name of a responsible engineer in the assignment field; and
posting bug status in the status field.

8. The method of claim 1, wherein displaying the defect record together with the first scope and the second scope on a screen further includes:
providing the screen with a plurality of windows for displaying the bug status;
identifying a plurality of scopes associated with the defect record;
assigning one of the plurality of windows to one of the plurality of scopes; and
inserting information relating to the scopes showing bug status in accordance with the product releases.

9. A multi-scope bug tracking system, comprising
a processing unit capable of executing instructions; and
a display coupled to the processing unit and configured to display a screen having a plurality of windows, wherein the plurality of windows further includes,
a first window operable to display a first scope indicating a first bug status showing progress of fixing a bug associated with a first product release; and
a second window operable to display a second scope indicating a second bug status showing progress of fixing the bug associated with a second product release,
wherein the second scope posts a bug fix available for downloading.

10. The system of claim 9, wherein the screen further includes a record field containing information relating to defect record.

11. The system of claim 10, wherein the defect record includes a bug identifier, a product release indicator, and a summary.

12. The system of claim 9, wherein the first window operable to display a first scope indicating a bug status associated with a first product release further includes a first product release field, a first engineer field, and a first bug status field.

13. The system of claim 12,
wherein the first product release field provides information indicating the first bug status associated with the first product release;
wherein the first engineer field names a responsible engineer to fix the bug; and
wherein the first bug status field tells the current status of the bug.

14. The system of claim 9, wherein the first bug status indicates a software patch; and wherein the second bug status indicates hardware fix.

15. An apparatus for bug tracking comprising:
means for receiving a bug report;
means for creating a defect record describing a bug in accordance with the bug report;
means for allocating a first predefined portion of a storage space for a first scope to track a first bug status showing progress of fixing the bug associated with a first product release;
means for allocating a second predefined portion of the storage space for a second scope to track a second bug status showing progress of fixing the bug associated with a second product release; and
means for displaying the defect record together with the first scope and the second scope on a screen, wherein means for displaying the defect record further includes means for posting a fix in the first scope capable of fixing the bug available for download.

16. The apparatus of claim 15, further comprising:
means for discovering an error during a system processing period; and
means for generating the bug report in response to the error.

17. The apparatus of claim 16, wherein means for discovering an error during a system processing period further includes means for recognizing one of a hardware error, a software error, and a combination of hardware and software errors.

18. The apparatus of claim 17, wherein means for generating the bug report in response to the error further includes means for submitting the report to a bug administrator by an operator indicating a discovery of the error.

19. The apparatus of claim 15,
wherein means for creating a defect record further includes means for storing defect record in a storage memory; and
wherein means for storing defect record in a storage memory includes means for allocating an identification field, a summary field, a description field, and a multi-scope field.

20. The apparatus of claim 15, wherein means for allocating a first predefined portion of storage space for a first scope further includes means for creating a product release field, an assignment field, and a status field.

21. The apparatus of claim 20, wherein means for creating a product release field, an assignment field, and a status field further includes:
means for identifying a product release information in the release field;
means for entering a name of a responsible engineer in the assignment field; and
means for posting bug status in the status field.

22. The apparatus of claim 15, wherein means for displaying the defect record together with the first scope and the second scope on a screen further includes:
means for providing the screen with a plurality of windows for displaying the bug status;
means for identifying a plurality of scopes associated with the defect record;
means for assigning one of the plurality of windows to one of the plurality of scopes; and
means for inserting information relating to the scopes showing bug status in accordance with the product releases.

* * * * *